(12) United States Patent
Kawauchi

(10) Patent No.: US 6,438,626 B1
(45) Date of Patent: Aug. 20, 2002

(54) SYSTEM IMPLEMENTING A STATE TRANSITION HAVING AN INTERFACE STORING A NEW NEXT STATE OF A SELF BLOCK AND EXCHANGING THE STATE INFORMATION WITH OTHER BLOCK

(75) Inventor: Hajime Kawauchi, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/280,545

(22) Filed: Mar. 30, 1999

(30) Foreign Application Priority Data

May 12, 1998 (JP) .......................... 10-146632

(51) Int. Cl.[7] ................................ H04L 1/22
(52) U.S. Cl. ................ 710/19; 710/15; 714/5; 714/37; 714/48
(58) Field of Search .............. 710/15, 18, 19; 714/5, 37, 39, 40, 43, 44, 47, 48, 49

(56) References Cited

U.S. PATENT DOCUMENTS 4,688,212 A * 8/1987 MacGinitie et al. ........ 370/360
5,517,616 A * 5/1996 Taylor .......................... 714/11
5,978,933 A * 11/1999 Wyld et al. ................... 714/13

* cited by examiner

*Primary Examiner*—Jeffrey Gaffin
*Assistant Examiner*—Ilwoo Park
(74) *Attorney, Agent, or Firm*—Venable; Robert J. Frank

(57) ABSTRACT

Each block is multiplexed. Each block is provided with an interface portion (10). A section terminating portion (11) receives overhead information from an associated equipment, and an APS byte processing portion (12) converts APS bytes contained in overhead information to event information. A state processing portion (16) inputs event information and state of a self block at an address on a state transition table (5) and read out a new next state information of said self block. The transition of a state of said self block is effected to a new state and its result information is transmitted to said associated equipment and the like. Sending and receiving of state information and state transition are hard-ware controlled, causing no load to firmware and allowing a high speed switching accordingly.

8 Claims, 4 Drawing Sheets

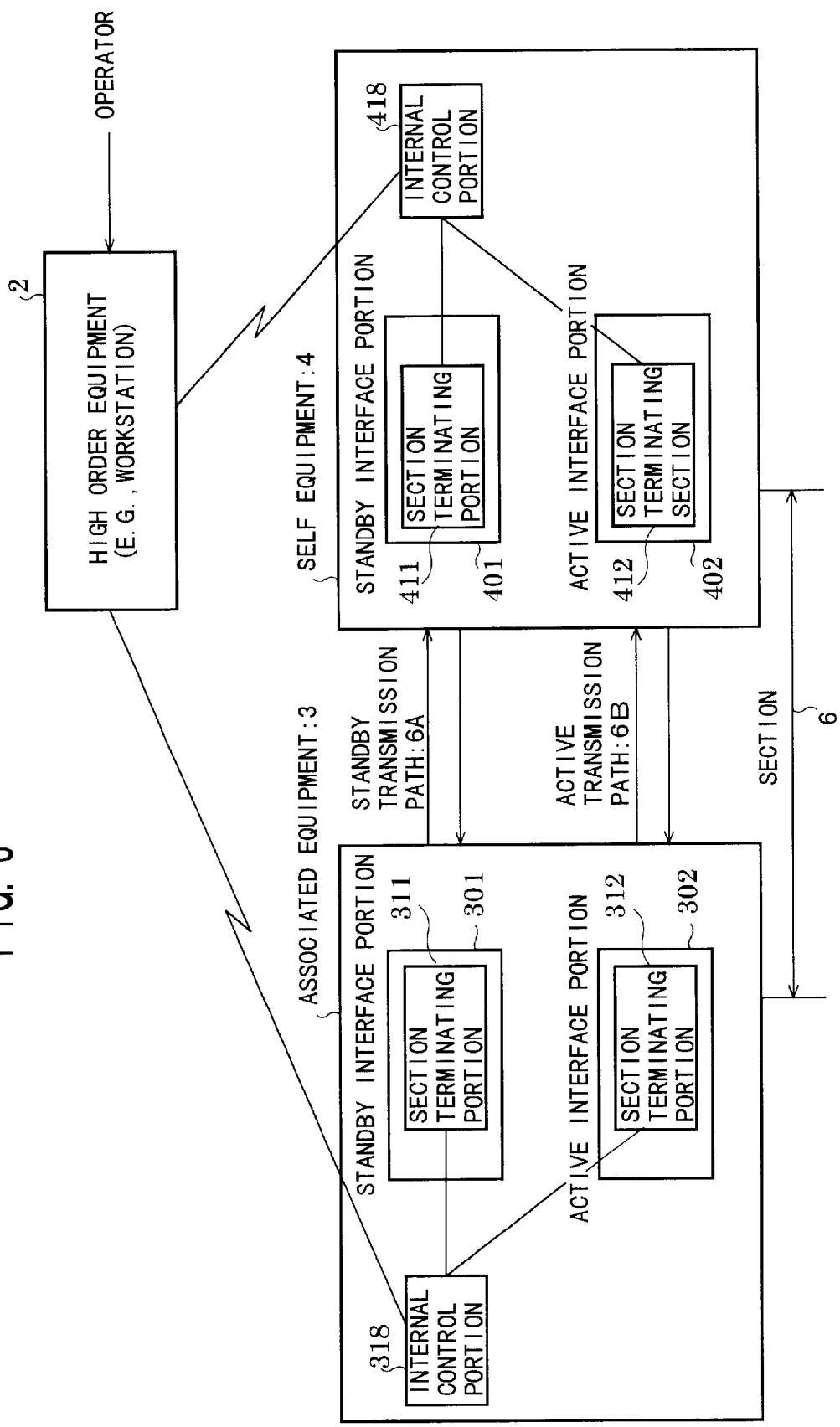

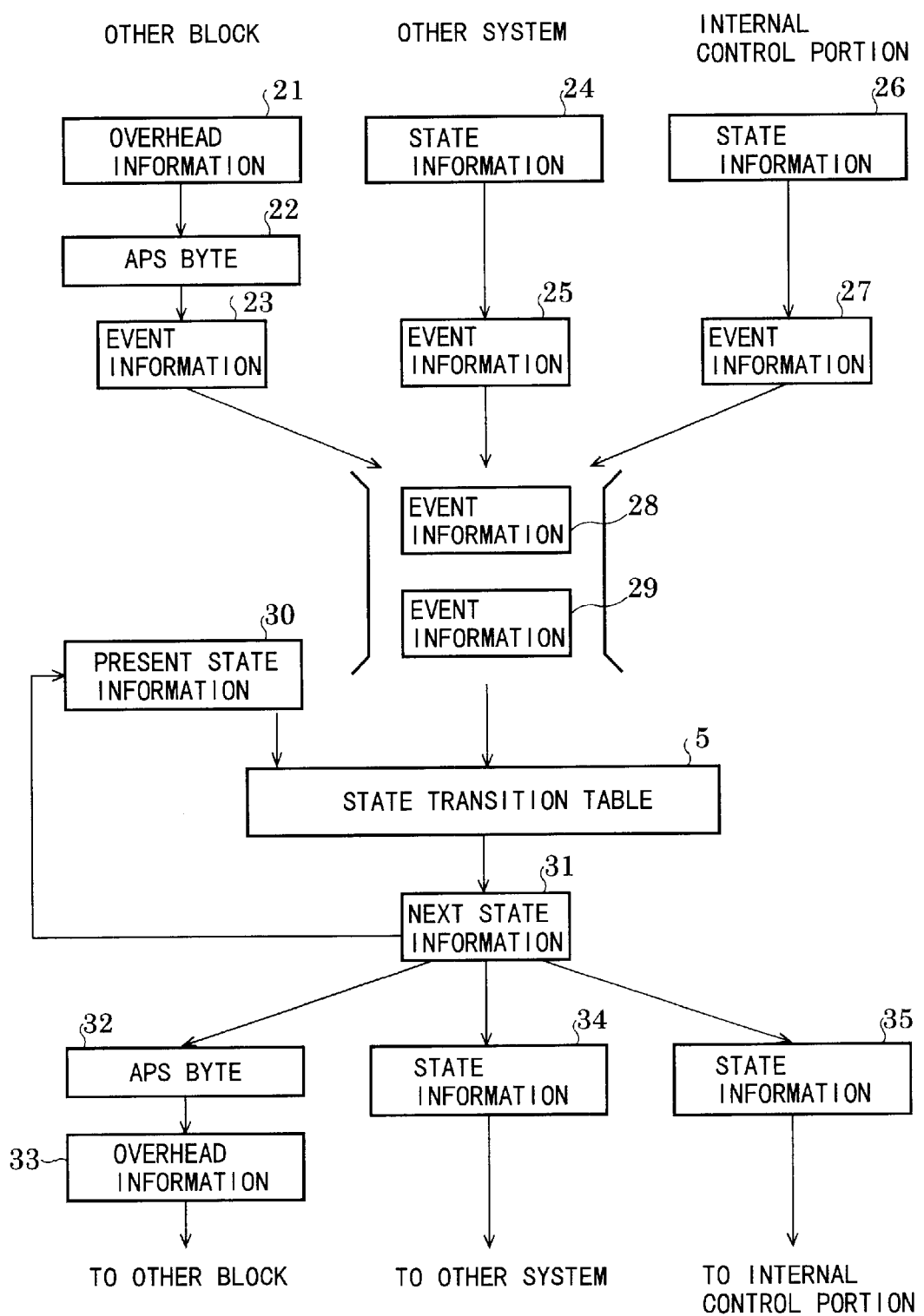

SYSTEM IMPLEMENTING A STATE TRANSITION HAVING AN INTERFACE STORING A NEW NEXT STATE OF A SELF BLOCK AND EXCHANGING THE STATE INFORMATION WITH OTHER BLOCK

BACKGROUND OF THE INEVENTION

The present invention relates to a multiplexed system which can be switched, as a whole, from a standby system to an active system and vice versa in such a system as transmission equipment wherein its each portion is multiplexed and a high degree of reliability is required.

If a fault occurs in a transmission path of an active system in a SDH (Synchronous Digital Hierarchy) transmission equipment having a duplexed transmission path, the equipment detects the fault automatically, thereby allowing a system to switch from an active transmission path to a standby transmission path. Control procedures for such switching are stipulated in recommendations of ITU-T (G.707,783) which has standardized operating procedures for the transmission equipment.

When a fault occurs, the transmission path or each of the transmission equipment and peripheral devices of the transmission equipment are adapted to send and receive signals for control of the switching among them, by using K1/K2 bytes of SOH (Section overhead) contained in bytes of APS (Auto protection switch) defined in the above stipulation, in order to execute switching operations of a system in cooperation with each other.

As triggers used for executing switching of a system, alarms for a portion and/or equipment, alarm from associated equipment, and an instruction for switching from high order equipment are included for use.

Two pieces of transmission equipment are placed opposite to each other with a group of transmission paths between. A high order equipment is used to monitor and control operations of two pieces of the transmission equipment. Out of the two pieces of the equipment, one is called "self equipment" and the other is called "other equipment". Here, the self equipment is mainly described herein.

The section represents a group of transmission paths used to connect the self equipment to the other equipment. The alarm for the section is an alarm outputted for the section to require the switching between transmission paths of a standby system and of an active system. The alarm for the equipment is an alarm outputted for the self equipment to require the switching between appropriate blocks of a standby system and of an active system within the equipment.

The alarm for the associated equipment is an alarm by which the associated equipment requests the self equipment to switch the system in harmony with the associated equipment when the associated equipment is switched from its standby system to its active system. An instruction for switching from high order equipment is an alarm by which the high order equipment requests the self equipment to be switched between a standby system and an active system when the high order equipment detects some faults.

In either case, the alarm is written into memory for writing of the alarm embedded in the self equipment. The firmware used to control the self equipment polls this memory. This enables reading of alarms from memory at a predetermined interval.

When the firmware reads the alarm out, it recognizes the source of an alarm by an address used to read the alarm from memory or by information about attributes of the alarm and renews a state transition diagram. The state transition diagram is stored in memory within the self equipment and holds the information about the state of each of the equipment parts, e.g., as to whether each part of the equipment is in the standby state or in the active state. If the firmware rewrites the information about the state, each of the equipment switches the state in accordance with the rewritten information. If a fault should be detected in a device which has been in the active state, the information about the state is adapted to be switched to the standby system accordingly. Then, a device having the same function as a device in an active state which has been in the standby state is switched to the active system.

However, there have been problems to be resolved in the related art described above.

That is, the firmware used to control the state transition of each portion of the transmission equipment reads, by polling, each alarm written in the said memory at a predetermined time interval T. However, because it is after a time T that the part polled immediately before the alarm is written is polled, there is a case where a maximum T time's delay in the timing of the alarm collection occurs. This may lead to a problem that the time required from when the fault is recognized by the firmware following the output of the alarm to when the switching of corresponding parts between a standby system and an active system is completed is prolonged.

Also, if the state of each of the self equipment part should be totally managed by the state transition table, renewing and management of the table are made complicated, imposing a huge load on a processor.

SUMMARY OF THE INVENTION

The present invention has been made to resolve the above problems. The first object of the present invention is to provide a multiplexed system having a group of blocks of an active system and of a standby system wherein parts used to control the state transition are made hardware-controlled as much as possible, thereby taking a load off the firmware.

The second object of the present invention is to provide a multiplexed system wherein the state transition is speeded up by making hardware-controlled, as much as possible, parts used to control the state transition with each block being linked with each other.

BRIEF EXPLANATION OF THE DRAWINGS

FIG. 3 is an explanatory drawing showing a cooperative operation.

FIG. 4 is an explanatory drawing showing an operation of a system of the present invention.

DESCRIPTION OF EMBODIMENTS

The present invention will be now described in details hereinafter with reference to the accompanying drawings, in which embodiments of the invention are shown.
<Embodiment>

Figure 1:
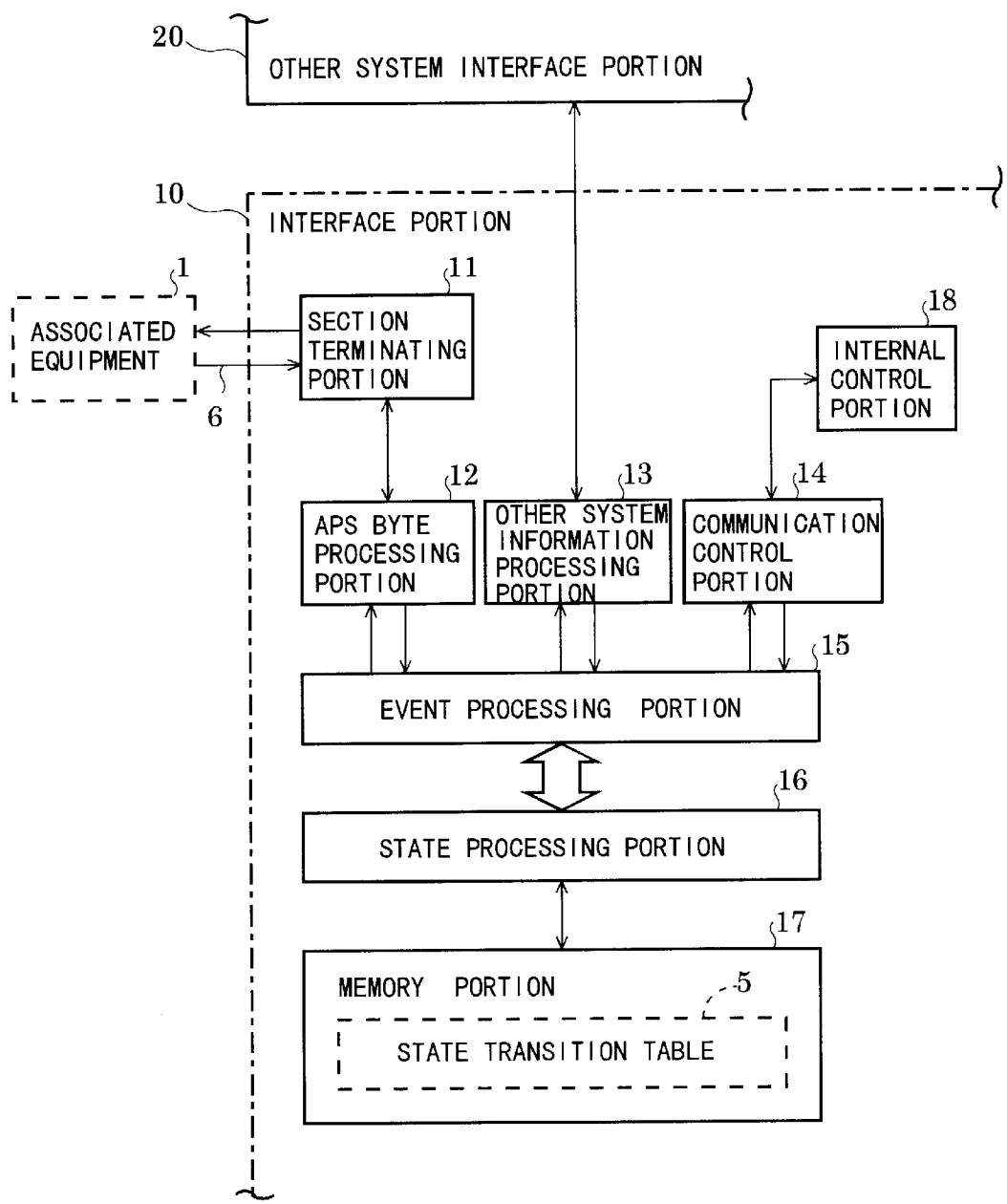
FIG. 1 is a block diagram illustrating a multiplexed system of the present invention.

FIG. 1 is a block diagram illustrating an embodiment of a multiplexed system of the present invention. The transmission equipment described hereinafter can be divided into arbitrary numbers of the block. According to the present invention, an interface portion 10 as shown in the drawing is newly and additionally provided to all blocks within the transmission equipment so that an state transition of the system can be controlled with each block being linked with each other. The interface portion 10 is provided to a standby-system block. Other system interface portion 20 is provided to an active-system block. Thus, these blocks as well as the interface portion are duplexed. Because the structure of the other system interface portion 20 is the same as that of the interface portion 10, only the structure of the interface portion 10 is concretely illustrated in the drawing. The block includes, for example, switches of the transmission equipment, power circuit, storage device, etc. The description of the block itself has been omitted as it is not related to the present invention.

The interface portion 10 is connected through associated equipment 1 and a section 6. The other system interface portion 20 is also connected through another associated equipment (not shown) and another section (not shown) as well.

The interface portion 10 is provided with a section terminating portion 11, APS byte processing portion 12, information processing portion 13 of other system, communication control portion 14, event processing portion 15, state processing portion 16 and memory portion 17.

The section terminating portion 11 constitutes a termination portion of the section 6. This section 6 is composed of a standby transmission path and of an active transmission path as described later with reference to FIG. 3. That is, the section 6 is a duplexed transmission path. The section terminating portion 11 is positioned at the termination site of the transmission path and has an interface function to exchange state information with the associated equipment 1. The associated equipment 1 is, for example, an another arbitrary adjacent block. The state information represents information about the state of the block, for example, associated equipment 1 which has sent information.

The section terminating portion 11 receives information about SOH (Section overhead) from associated equipment 1. The SOH information is the information, including the state information, which is sent and received among blocks so that switching between a standby system and an active system can be achieved automatically in cooperation with each other whenever a fault occurs in each block. A signal frame sent and received through a transmission path consists of SOH information and a payload. The K1/K2 bytes are contained in part of the SOH information.

The SOH information, as described above, is contained in bytes of APS (Auto protection switch) defined in the recommendations of ITU-T (G.707,783). The K1/K2 bytes contained in the APS bytes constitutes a control signal for switching of a certain system.

The section terminating portion 11 has functions to separate and extract the APS bytes from the SOH information and comprises, for example, a register used to hold signals received and a transfer circuit used to select part of signals corresponding to the APS bytes out of the received signals and to transfer them to the APS byte processing portion 12.

The APS byte processing portion 12 has functions to process the APS bytes transferred from the section terminating portion 11 for the production of corresponding event information and to send it to an event processing portion. This APS byte processing portion 12 comprises a decoder used to convert, for example, the APS byte to an event information. The event information proper is substantially the information as to which block has switched and what state each block has switched to. The output of the decoder of said APS byte processing portion 12 is fed to the event processing portion 15. A state processing portion 17 and a state transition table 5 are adapted to play a role in determining a state of a self block in accordance with an event information inputted to the event processing portion 15.

Other system information processing portion 13 is connected to the other system interface portion 20 having the same configuration as that of the interface portion 10 as shown in the drawing and has a function to exchange a state information. The other system information processing portion 13 has a function to separate and extract an event information out of the state information received from the other system interface 20 and consists of a register used to hold the received signal and a transfer circuit used to select part of the signals corresponding to the event information and transfer them to the event processing portion 15.

A communication control portion 14 is an interface for communication used to receive an event information inputted from an internal control portion 18 and to transfer it to the event processing portion 15.

The event processing portion 15 has functions to manage an event information fed, at an arbitrary timing, by the APS byte processing portion 12, other system information processing portion 13 and communication control portion 14 and then to sequentially transfer it to the state processing portion 16 and comprises, for example, a pushup (first-in first-out) storage and the like. Accordingly, the event inputted first from the event processing portion 15 is adapted to be transferred first to the state processing portion 16 in turn.

The state processing portion 16 have functions to gain access to the memory portion 17 by using higher order bits to represent data having, for example, information about the present state of the self block and lower order bits to represent data having an event information inputted from the event processing portion 15 and also using these signals as address signals. That is, the state processing portion 16 consists of an address register and the like used to receive an input signal and to generate an address signal. The state transition table 5 is housed in the memory portion 17.

Figure 2:
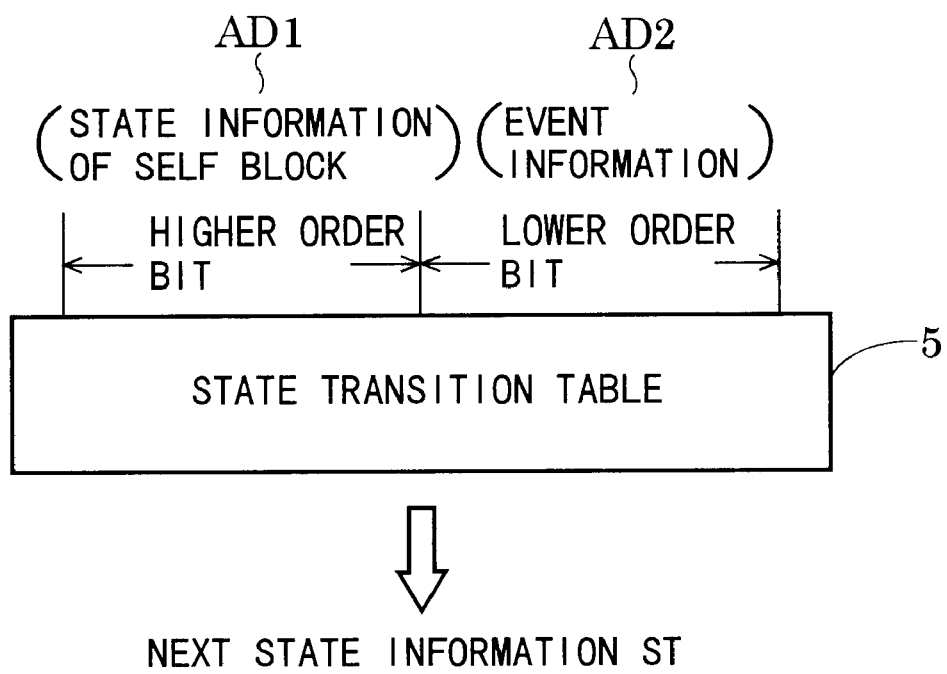
FIG. 2 is an explanatory drawing showing an operation of a state transition table.

FIG. 2 is an explanatory drawing showing an operation of a state transition table. The state transition table 5 is provided as a decoder.

The state transition table is so constructed that, when an address signal using higher order bits to represent the present state information AD1 of the self block and lower order bits to represent an event information AD2 is inputted from the state processing portion 16, next new state information ST written in the address signal can be read out. The new state information read out is stored, for example, in part of the memory portion 17. Then, a transition of the state on the interface portion 10 is effected to a new state.

The state transition table 5 is so constructed that a next new state information of the self block is adapted to be stored on a memory address having values obtained by combining an event information as to which block has switched and what state each block has switched to with a present state information of the self block. The state includes "a state being now under operation in a standby system or an active system" and/or "a state being waiting for switching in other system even after having sent a request for a state switching to other system following detection of a fault". The state is also expressed in such a manner that it can include a concrete next state to which a transition has to be effected corresponding to various events.

If the state undergoing various transition by block should be managed in a batched way by firmware monitoring and controlling a whole transmission equipment, its control is made complicated, causing an increase in a load. Moreover, it takes time to process. Thus, in the system of the present invention, such a state transition table as described above is provided to each block thereof and a transition of the state of the self block is automatically effected corresponding to a state transition of other block.

The APS byte processing portion 12 has functions, besides those described above, to convert the new state information to APS bytes when a state of the self block is switched to a new state and to output them to the section terminating portion 11.

The section terminating portion 11 has functions to send the APS bytes outputted by the APS byte processing portion 12, as overhead information, to the associated equipment 1. This causes the state transition of the interface portion 10 to be transmitted to the associated equipment 1 accordingly.

The other system information processing portion 13 has functions, besides those described above, to feed new state information, when a state of the self block is switched to a new state, to the other system interface portion 20. This causes the state transition of the interface portion 10 to be transmitted to the other system interface portion 20.

The communication control portion 14 has functions, besides those described above, to feed new state information, when a state of the self block is switched to a new state, to the internal control portion 18. This causes the state transition of the interface portion 10 to be transmitted to the internal control portion 18.

The operations of the block having the interface portion 10 described above are as follows.

FIG. 3 is an explanatory drawing showing a cooperative operation.

As shown in FIG. 3, the interface portion is duplexed in both the self equipment 4 and the associated equipment 3. The associated equipment 3 is provided with an standby interface portion 301 and an active interface portion 302. These interface portions are controlled by an internal control portion 318. The self equipment 4 is provided with a standby interface portion 401 and an active interface portion 402. These interface portions also are controlled by an internal control portion 418.

With reference to FIG. 3, an operation will be described that, when the active interface portion 302 of the associated equipment 3, for example, is switched to the standby system and the standby interface portion 301 thereof is switched to the active system, the active interface portion 402 of the self equipment 4 is automatically switched to the standby system and the standby interface portion 401 thereof is automatically switched to the active system.

The block configurations and/or connections within each of the interface portions 301, 302, 401 and 402 are the same as those of the interface portion 10 shown in FIG. 1. To simplify the drawing, in FIG. 3, section terminating portions 311, 312, 411 and 412 within each of the interface portions only are illustrated. A high order equipment 2 is connected to the internal control portion 418 of the self equipment 4 and to the internal control portion 318 of the associated equipment 3. All the blocks constituting the transmission equipment shown in the drawing are controlled by the high order equipment 2.

A standby transmission path 6A is used for connections between the standby interface portions 301 and 401. An active transmission path 6B is used for connections between the active interface portions 302 and 402. These standby transmission path 6A and active transmission path 6B constitute a section 6.

When the standby interface portion 301 of the associated equipment 3 is switched to the active system and the active interface portion 302 is switched to the standby system under such a condition, operations are as follows.

That is, the overhead information is exchanged reciprocally between the standby interface portions 301 and 401 via the standby transmission path 6A. Also, the overhead information is exchanged reciprocally between the active interface portions 302 and 402 via the active transmission path 6B. While the state information is being exchanged each time the state is switched, the state of the self block is switched in turn.

Thus, a cooperative operation of the block is completed that, when the active interface portion 302 of the associated equipment 3 is switched to its standby system and the standby interface portion 301 is switched to its active system, the active interface portion 402 of the self equipment is automatically switched to its standby system and the standby interface portion 401 is automatically switched to its active system.

Such a cooperative operation of each block has been conventionally carried out as well, i.e., the switching operation of many blocks has been conventionally monitored by firmware in a batched manner to control the state transition. However, in this related art, the interface portion 10 as shown in FIG. 1 is adapted to receive necessary state information from the associated equipment, other interface portion or internal control portion and to switch its state automatically by using the state transition table 5. At the same time, the state information after switching is fed to the associated equipment, other systems, internal control portion and the like.

However, almost all of the above systems carrying out such a series of cooperative operations can be hard-ware controlled. That is, for example, the section terminating portion 11 can be replaced by a register, the APS byte processing portion 12 by a decoder, other system information processing portion 13 by a register, the event processing portion 15 by a pushup storage, the state processing portion 16 by an address register and the state transition table 15 by a memory portion 17.

Accordingly, if such switching is controlled by firmware in accordance with the conventional technologies, the time required from detection of the switching event of any of blocks to completion of the switching operation of all blocks has been approximately several hundred milliseconds, however, according to the present invention, switching operations can be accomplished at a speed of several microseconds or less, though it varies depending on operating frequency of hardware.

FIG. 4 is an explanatory drawing showing an overall operation of a system of the present invention.

In FIG. 4, when an overhead information 21 is fed to a self block from other block, an APS byte is extracted and converted to an event information 23. Also, if a state information 24 is fed to the self block from other system block, it is converted to an event information 25. If a state information 26 is fed to the self block from an internal control portion, it is converted to an event information 27 as well. The event information inputted is aligned in the order of inputting in the event processing portion 15 already described above and is transferred to the state processing portion 16 in the order of inputting. The event information 28, 29 shown in FIG. 4 is one of examples of such an event information fed and to be transferred.

Of course, the inputting of the overhead information 21 from other block, state information 24 from other block and state information 26 from the internal control portion are independently carried out at an arbitrary timing.

As shown in FIG. 4, when an address data obtained by combining a present state information 30 of a self block with an event information 29 inputted is fed to a state transition table 5, a new next state information 31 is read out from the state transition table 5. The read-out new next state information 31 is used to switch a state of the self block and, after being replaced with the present state 30, is adapted to be stored temporarily in a memory portion 17. In addition, a new next state information 31 is converted to APS bytes 32 and is included into an overhead information 33 and then is fed to other block. Furthermore, another new next state information 31 is transferred to other system as a state information 34 and to an internal control portion as a state information 35.

Again with reference to FIG. 4, because the overhead information 21, APS byte 32, event information 23, 25, 27, present state information 30 and next state information are all simple signals, they can be easily transferred and converted, allowing the interface portion to be implemented by simple hardware or to be hard-ware controlled easily. The replacement with hardware allows processing to be speeded up compared with the firmware, taking a load off the firmware accordingly.

In said embodiments, the configurations and operations of the system of the present invention have been described by taking transmission equipment having a SDH interface as an example, however, it is easily understood by those skilled in the art that any kind of system can implement the same functions if a system can be divided into various multiplexed block and allows state information to be exchanged between blocks.

Also, if the state transition table is so constructed that a new next state information of a self block can be stored at an address obtained by combining state information from other block with that of the self block, any combination of the state information is acceptable, i.e., the address can be produced by any combination between the state of other block and of the self block. That is, any signal can be used for high order bits or for low order bits.

The above-described embodiment provides a system wherein the interface portion is provided with the APS byte processing portion, other system information processing portion and communication control portion, but is not limited to such an application and it can be provided with the APS byte processing portion only or with other system information processing only. Moreover, a combination of the APS byte processing portion with other system information processing portion or a combination of other system information processing and communication control portion is also applicable thereto.

<Effects of the Invention>

In the multiplexed system described above, the system is divided into multiplexed blocks and a state information is exchanged by an interface portion embedded in each block and wherein a self block is controlled so that the transition of the state of the self block is effected to a new next state corresponding to a state transition of other block and the resulting state information is transferred to outside, thus implementing a high speed control on the state transition. Therefore, such complicated control as is required in the firmware control system is not necessary, thereby achieving cost reduction of the high order equipment used to control the whole system.

What is claimed is:

1. A multiplexed system having a plurality of blocks implementing a state transition corresponding to other block, each of said plurality of blocks being provided with an interface portion used to exchange state information with other block and said interface comprising:

a section terminating portion for exchanging state information with other block, a memory portion storing a state transition table wherein a new next state of a self block is memorized at an address obtained by combining state information of other block received by said section terminating portion with that of said self block, and a state processing portion which reads out new next state information of said self block from said memory portion and send out this state information, when a state of said self block is switched to a new state, to other block via said section terminating portion.

2. The multiplexed system defined in claim 1 wherein a APS (Auto protection switch) byte processing portion is provided between said section terminating portion and said state processing portion, characterized in that said section terminating portion is adapted to extract APS bytes out of overhead information received from other block and said APS byte processing portion is adapted to process APS bytes extracted by said section terminating portion to produce corresponding event information and to incorporate the event information into part of an address to be fed to said memory portion and, when a state of said self block is switched to a new state, to convert the new state information to APS bytes and output them to said section terminating portion.

3. A system multiplexed by using an active system block group and a standby system block group, said each block being provided with an interface used to exchange state information with other system block and said interface comprising:

other system information processing portion for exchanging state information with other system block, a memory portion storing a state transition table wherein a new next state of a self block is memorized at an address obtained by combining state information of other block received by said other information processing portion with that of a self block, and a state processing portion which reads out new next state information of said self block from said memory portion and send out this state information, when a state of said self block is switched to a new state, to other block via said other system information processing portion.

4. The multiplexed system defined in claim 3 comprising:

other information processing portion for separating and extracting event information from a state information received from other system interface portion, a section terminating portion for separating and extracting APS bytes from overhead information received from any other block, an APS processing portion for processing APS bytes transferred from said section terminating portion and for producing a corresponding event, and an event processing portion for managing an event fed by said APS byte processing portion and said other system information processing portion at an arbitrary timing and for transferring it to a state processing portion in turn.

5. The multiplexed system defined in claim 3 comprising:

other system information processing portion for separating and extracting event information from state information received from other system interface portion, a communication control portion for receiving an event fed by an internal control portion and for transferring it to an event processing portion, and an event processing portion for managing event information fed by said other system information processing portion and said communication control portion at an arbitrary timing and for transferring it to a state processing portion in turn.

6. The multiplexed system defined in claim 4 comprising:

a communication control portion for receiving event information fed by an internal control portion and for transferring it to an event processing portion, and an event processing portion for managing event information fed by said APS byte processing portion, said other system information processing portion and said communication control portion at an arbitrary timing and for transferring it to a state processing portion in turn.

7. The multiplexed system defined in claim 6 wherein said other system information portion is characterized in that, when a state of said self block is switched, it can output the state information to other system via other system interface portion.

8. The multiplexed system defined in claim 6 wherein said communication portion is characterized in that, when a state of a self block is switched, it can output the state information to an internal control portion.

* * * * *